United States Patent
Saito et al.

(10) Patent No.: US 10,897,045 B2
(45) Date of Patent: Jan. 19, 2021

(54) CROSSLINKED FUNCTIONAL BINDERS AND THEIR USE IN SILICON-CONTAINING ANODES OF LITHIUM-ION BATTERIES

(71) Applicant: UT-Battelle, LLC, Oak Ridge, TN (US)

(72) Inventors: Tomonori Saito, Knoxville, TN (US); Pengfei Cao, Knoxville, TN (US); Jagjit Nanda, Knoxville, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 99 days.

(21) Appl. No.: 16/032,207

(22) Filed: Jul. 11, 2018

(65) Prior Publication Data
US 2019/0319269 A1 Oct. 17, 2019

Related U.S. Application Data

(60) Provisional application No. 62/655,857, filed on Apr. 11, 2018.

(51) Int. Cl.
*H01M 4/62* (2006.01)
*H01M 10/0525* (2010.01)
(Continued)

(52) U.S. Cl.
CPC ........... *H01M 4/622* (2013.01); *H01M 4/485* (2013.01); *H01M 4/505* (2013.01); *H01M 4/525* (2013.01);
(Continued)

(58) Field of Classification Search
CPC ....... C08L 33/26; C08L 2312/00; C08K 5/08; C08K 5/13
See application file for complete search history.

(56) References Cited

U.S. PATENT DOCUMENTS 4,749,800 A * 6/1988 Jobe ..................... C08B 3/14
549/347
5,780,606 A * 7/1998 Kandil ............... A61K 39/095
536/18.7
(Continued)

FOREIGN PATENT DOCUMENTS

CN 107011609 A * 8/2017

OTHER PUBLICATIONS

Machine translation of CN-107011609-A (no date).*
(Continued)

*Primary Examiner* — Amanda C. Walke
(74) *Attorney, Agent, or Firm* — Scully, Scott, Murphy & Presser, P.C.

(57) ABSTRACT

A crosslinked polymer composition comprising: (i) a base polymer containing a multiplicity of at least one type of functional group selected from amino, amido, thiol, carboxylic acid, carboxylic acid ester, and epoxy groups; (ii) a multiplicity of hydroxylated benzene rings covalently linked to the base polymer, wherein each hydroxylated benzene ring contains at least two hydroxy groups, and with at least two of the hydroxy groups on said hydroxylated benzene rings being free as OH groups; and (iii) a multiplicity of crosslinking groups that crosslink at least two of said functional groups in the base polymer. The invention is also directed to lithium-ion batteries in which the above-described composition is incorporated in an electrode of the battery, and also directed to methods of operating a lithium-ion battery in which the above-described crosslinked polymer composition is incorporated in an electrode thereof.

23 Claims, 7 Drawing Sheets

(51) Int. Cl.
    *H01M 4/583* (2010.01)
    *H01M 4/485* (2010.01)
    *H01M 4/525* (2010.01)
    *H01M 4/505* (2010.01)
    *C08K 5/13* (2006.01)
    *H01M 4/02* (2006.01)
    *C08L 5/08* (2006.01)

(52) U.S. Cl.
    CPC ....... *H01M 4/583* (2013.01); *H01M 10/0525* (2013.01); *C08K 5/13* (2013.01); *C08L 5/08* (2013.01); *C08L 2203/20* (2013.01); *C08L 2312/00* (2013.01); *H01M 2004/027* (2013.01); *H01M 2004/028* (2013.01)

(56) References Cited

U.S. PATENT DOCUMENTS

| | | | |
|---|---|---|---|
| 5,977,275 A * | 11/1999 | Rodrigues | C08F 20/30 510/281 |
| 7,205,073 B2 | 4/2007 | Kim et al. | |
| 7,425,388 B2 | 9/2008 | Park et al. | |
| 8,252,438 B2 | 8/2012 | Han et al. | |
| 8,496,855 B2 | 7/2013 | Choi | |
| 9,642,933 B2 * | 5/2017 | Yang | C08G 63/668 |
| 9,828,407 B2 * | 11/2017 | Auriol | A61P 37/02 |
| 10,173,900 B2 * | 1/2019 | Ludvik | H01M 4/625 |
| 2008/0085871 A1 * | 4/2008 | Tam | A61P 35/00 514/50 |
| 2013/0248109 A1 * | 9/2013 | Grubbs | C09J 133/26 156/325 |
| 2014/0331896 A1 * | 11/2014 | Heinzman | D04H 1/56 106/214.2 |

OTHER PUBLICATIONS

Cao P. et al., "Effect of Binder Architecture on the Performance of Silicon/Graphite Composite Anodes for Lithium Ion Batteries", Applied Materials & Interfaces (2018), vol. 10, pp. 3470-3478 DOI: 10.1021/acsami.7b13205.

Lee J. et al., "Amphiphilic Graft Copolymers as a Versatile Binder for Various Electrodes of High-Performance Lithium Ion Batteries", Small Journal (2016), pp. 1-9 DOI: 10.1002/sml1.201600800.

Wei L. et al., "Poly (acrylic acid sodium) grafted carboxymethyl cellulose as a high performance polymer binder for silicon anode in lithium ion batteries", Scientific Reports (2016), pp. 1-8 DOI: 10.1038/srep19583.

Bie Y. et al., "Polydopamine Wrapping Silicon Cross-linked with Polyacrylic Acid as High-Performance Anode for Lithium-Ion Batteries", Applied Materials & Interfaces (2016), 8, pp. 2899-2904 DOI: 10.1021/acsami.5b10616.

Gao H. et al., "Cross-Linked Chitosan as a Polymer Network Binder for an Antimony Anode in Sodium-Ion Batteries", Advanced Energy Materials (2016), 6, 7 pages DOI: 10.1002/aenm.201502130.

Park S. et al., "Mussel-Inspired Polydopamine Coating for Enhanced Thermal Stability and Rate Performance of Graphite Anodes in Li-Ion Batteries", Applied Materials & Interfaces (2016), 8, pp. 13973-13981 DOI: 10.1021/acsami.6b04109.

Ryou M. et al., "Mussel-Inspired Adhesive Binders for High-Performance Silicon Nanoparticle Anodes in Lithium-Ion Batteries" Advanced Materials (2013), 25, pp. 1571-1576 DOI: 10.1002/adma.201203981.

Yavvari P.S. et al., "Robust, self-healing hydrogels synthesised from catechol rich polymers", Journals of Chemistry B (2015), 3, pp. 899-910 DOI: 10.1039/c4tb01307g.

* cited by examiner (5C)

(5D)

CROSSLINKED FUNCTIONAL BINDERS AND THEIR USE IN SILICON-CONTAINING ANODES OF LITHIUM-ION BATTERIES

CROSS REFERENCE TO RELATED APPLICATION

The present application claims benefit of U.S. Provisional Application No. 62/655,857, filed on Apr. 11, 2018, all of the contents of which are incorporated herein by reference.

GOVERNMENT SUPPORT

This invention was made with government support under Prime Contract No. DE-AC05-00OR22725 awarded by the U.S. Department of Energy. The government has certain rights in the invention.

FIELD OF THE INVENTION

The present invention generally relates to anode compositions for lithium-ion batteries, and more particularly, to lithium-ion batteries having a silicon-containing anode.

BACKGROUND OF THE INVENTION

Increasing the energy density of the lithium-ion battery (LIB) is necessary to meet the demands for their expanding applications from portable electronics to large-scale emerging applications, such as renewable energy storage grids and electric vehicles that require acceptable driving distance upon a single charging. Among many candidates that can increase the energy density of the anode, silicon (Si) is highly promising due to its high theoretical capacity (3579 mAh/g for Si compared to 372 mAh/g for commercial graphite anode), low operating potential, non-toxicity and worldwide abundance (e.g., Du et al., *J. Mater. Chem. A*, 4, 32, 2016).

However, the high specific capacity of the silicon-based electrode is typically observed only at the initial cycles, and cannot meet the long cycle life required for typical electric vehicle application. At a fundamental level, the origin of fast capacity fade is mainly due to two main factors: (i) very large volume fluctuation (about 280%) during the lithiation and delithiation process that causes the fracturing, pulverization and electrical isolation of silicon particles from the electrode matrix; and (ii) continuous formation and reformation of the solid electrolyte interfaces (SEI) during charge-discharge which consumes extra lithium and results in lower coulombic efficiency (e.g., Nishikawa et al., *J. Power Sources*, 302, 46, 2016). Fabrication of the silicon-based electrode with nano/micro-hierarchical structures, such as nanotubes, nanopillars, porous particle, and core-shell nanofibers have been explored and have achieved some success in reducing the dimensional stress during volume change. However, the complex and costly production process make these approaches challenging to deploy in practical applications. Moreover, there remains a need for significantly improved cycling performance, particularly in capacity retention and coulombic efficiency over extended numbers (e.g., hundreds or thousands) of cycles.

The role of binder is critical to the electrochemical performance and cycle life of the next generation lithium-ion batteries that can fulfill the requirement of future consumer electronics, such as electric vehicles (S.-L. Chou et al., *Physical Chemistry Chemical Physics* 2014, 16 (38), 20347-20359). This is especially true for high-capacity anodes, such as silicon (Si), which undergoes extraordinary volume expansion during the alloying process (up to 280% for $Li_{15}Si_4$) (J.-T. Li et al., Advanced Energy Materials 2017, 7(24). Rapid capacity fade of the Si anode occurs in several modes, including pulverization of Si anode, disconnection of active materials with conducting network or current collector, and instability of solid electrolyte interface (SEI). Traditionally, the binder provides an adhesive network to hold the active material and electronically conducting diluents, such as carbon black, on the current collector. With the advent of high capacity alloy and conversion electrodes, there is a greater necessity to design polymer binders that serve multifunctional purposes. The commonly used polymeric binder for the lithium-ion battery is polyvinylidene fluoride (PVDF), which is successful for a majority of intercalation based electrode materials, such as graphite. However, PVDF does not work for alloy and conversion-based electrodes that undergo severe volume changes usually accompanied by irreversible structural transition (M. N. Obrovac et al., *Electrochemical and Solid-State Letters*, 2004, 7(5), A93-A96). Furthermore, PVDF is incorporated into the electrode fabrication process through a randomized slurry coating method that has fewer controls on such aspects as electrode-binder interactions, surface functionality, and other relevant attributes. Thus, there is a need for new binder materials that can accommodate the significant volume changes in lithium-ion battery anodes and also provide improved electrochemical performance and cycle life.

SUMMARY OF THE INVENTION

In one aspect, the invention is directed to a crosslinked polymer composition useful as a novel binder for a silicon-based anodic material in a lithium-ion battery. Incorporation of this binder into the anode of a lithium-ion battery advantageously results in an exceptional cycling performance and retention, particularly in capacity retention and coulombic efficiency over extended numbers of cycles. The novel binder includes the following components: (i) a base polymer containing a multiplicity of at least one type of functional group selected from amino, amido, thiol, carboxylic acid, carboxylic acid ester, and epoxy groups; (ii) a multiplicity of hydroxylated benzene rings covalently linked to the base polymer, wherein each hydroxylated benzene ring contains at least two hydroxy groups, and with at least two of the hydroxy groups on each of said hydroxylated benzene rings being free as OH groups; and (iii) a multiplicity of crosslinking groups that crosslink at least two of the functional groups in the base polymer. In particular embodiments, the base polymer contains at least amino groups, in which case the base polymer may be, for example, an amino-containing polysaccharide, such as chitosan.

In another aspect, the invention is directed to lithium-ion batteries in which the above binder is incorporated. The binder is particularly considered for incorporation into an anode of the lithium-ion battery. In particular embodiments, the lithium-ion battery includes at least: (i) an anode containing the above-described binder and silicon nanoparticles embedded in the binder, (ii) a cathode suitable for a lithium-ion battery, and (iii) a lithium-containing electrolyte medium in contact with the anode and cathode. The invention is also directed to the operation of a lithium-ion battery in which any of the above anodic compositions is incorporated.

By virtue of the improved properties of the anodic compositions described herein, the resulting lithium-ion battery containing the anodic composition described above provides several advantages over conventional lithium-ion batteries of the art, including high reversible capacities, high retention of capacity after hundreds or thousands of cycles, and high coulombic efficiencies and retention thereof. In particular embodiments, the binder is a crosslinked catechol-functionalized chitosan network that possesses both wetness-resistant adhesion capability and mechanical robustness via in-situ formation of a three-dimensional (3D) network in the binder. The present invention advantageously permits adjustment in such parameters as the grafting density of adhesion groups and extent of crosslinking to suitably adjust the electrochemical and physical performance. Atomic force microscopy (AFM) pulling tests also indicate that the catechol-Si interaction is stronger than typical hydrogen bonding. The relationship between fundamental polymer properties and electrochemical performance can be established by assessing the rheological behavior of polymer solutions, mechanical properties of the resulting anodic coating, adhesion force of the binder with silicon nanoparticles, and the morphological evolution of the electrode before and after cycling. As further discussed below, an exemplary functional polymer network has herein been prepared that exhibits a capacity retention of 91.5% after 100 cycles (2144±14 mAh/g) when used as a binder for a silicon anode.

BRIEF DESCRIPTION OF THE DRAWINGS

FIG. 1A is a scanning electron microscope (SEM) image of the silicon nanoparticles-based (i.e., "SiNPs-based") composite electrode (anode) with CS-CG10%+6% GA as the binder; FIG. 1B is a zoom-in area for energy-dispersive X-ray spectroscopy (EDX) mapping; and FIGS. 1C, 1D, and 1E show the EDX mapping of silicon, carbon, and oxygen, respectively, in the specified area.

FIG. 2A is a graph showing the specific capacity of SiNPs-based electrodes with PVDF, CS, CS-CG10% and CS-CG25% as the anode binder; FIG. 2B is a graph showing the coulombic efficiency of the same composition studied in FIG. 2A.

FIG. 3A is a bar chart showing related adhesion force of different polymer binders measured by AFM with a colloidal silica tip (15 μm diameter); FIG. 3B is a graph showing the results of a peel test for a silicon nanoparticles-based anode (i.e., SiNPs-based anode) with different polymer binders.

FIG. 5A is a graph showing cycling performance and FIG. 5B is a graph showing coulombic efficiency, of SiNPs-based electrodes with different anode polymer binders: PVDF, CS, LiPAA, CS-CG10% and CS-CG10%+GA6%; FIG. 5C is a graph showing a dQ/dV profile and FIG. 5D is a graph showing the first voltage vs. capacity curve, of SiNPs-based electrodes with CSCG10%+GA6% as the binder.

DETAILED DESCRIPTION OF THE INVENTION

Figures 1A, 1B, 1C, 1D, 1E:
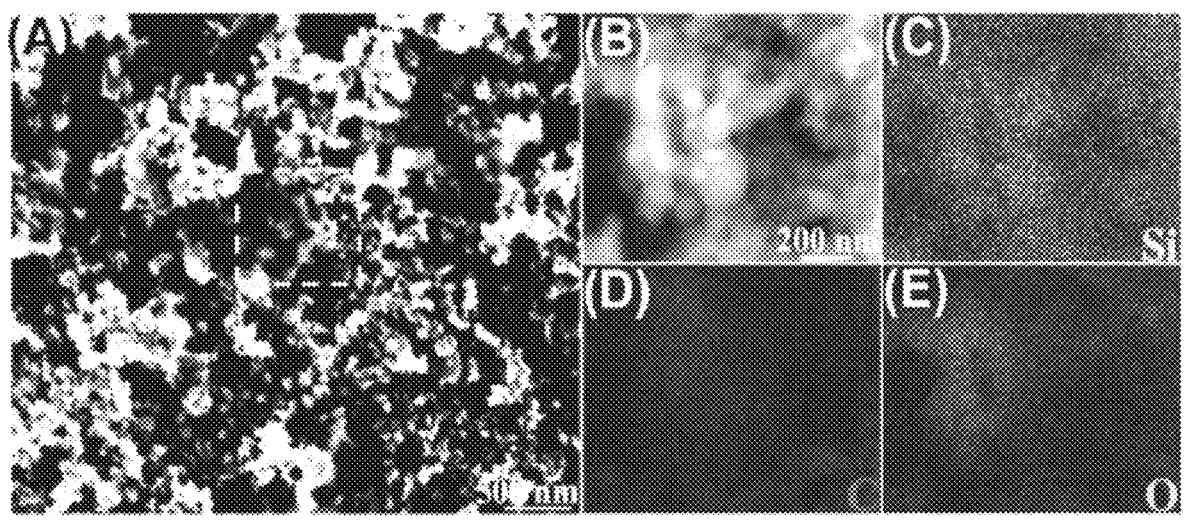
FIGS. 1A-1E.

In a first aspect, the invention is directed to a crosslinked polymer composition useful as a binder in an electrode, particularly in a silicon-containing anode of a lithium-ion battery. The crosslinked polymer contains: (i) a base polymer containing a multiplicity of at least one type of functional group selected from amino, amido, thiol, carboxylic acid, carboxylic acid ester, and epoxy groups, (ii) a multiplicity of hydroxylated benzene rings covalently linked to the base polymer, wherein each hydroxylated benzene ring contains at least two hydroxy groups, and with at least two of the hydroxy groups on each of the hydroxylated benzene rings being free as OH groups; and (iii) a multiplicity of crosslinking groups that crosslink at least two of the functional groups in the base polymer.

The crosslinked polymer composition can be conveniently expressed by the following general structure:

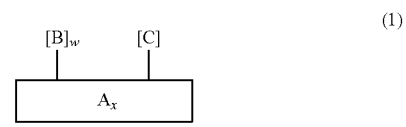

(1)

In Formula (1) above, $A_x$ represents the base polymer (component i); $[B]_w$ represents a multiplicity of hydroxylated benzene rings (B) bound to the base polymer and present in a grafting density w (component ii); and [C] represents a multiplicity of functional groups (C), as described above. In the crosslinked composition, a multiplicity of crosslinking groups crosslink at least two of the functional groups originally present on the base polymer, so that at least a portion of the functional groups (C), such as amino, amido, or epoxy groups, are no longer free. The functional groups being crosslinked may be within the same base polymer strand, or in different base polymer strands, or both. Generally, the crosslinking groups crosslink at least or more than 1%, 2%, or 5%, but generally no more than (or less than) 6%, 8%, 10%, 20%, 30%, 40%, 45%, or 50% of the total functional groups (e.g., amino or amido groups) present in the base polymer. Alternatively, the crosslinker (component iii) is present in an amount of at least or above 1, 2, 3, 4, or 5 wt %, but no more than 12, 15, 18, or 20 wt % by weight of the crosslinked polymer. The hydroxylated benzene rings (B) may or may not also be bound to the base polymer via functional groups (C) originally present on the base polymer. Generally, in order to provide functional groups for crosslinking, a portion of free functional groups (C) remain on the base polymer even if the hydroxylated benzene rings (B) are also bound via the functional groups. Free functional groups may or may not also be present after crosslinking of the functional groups.

More specifically, $A_x$ represents a solid (rigid or flexible, but not liquid) base polymer (A) having a number (x) of monomeric units that have been polymerized (i.e., polymerized units), wherein x (degree of polymerization, i.e., DP, of A) is generally about, at least, or greater than 20, 30, 40, 50, 60, 70, 80, 90, 100, 150, 200, 250, 300, 400, or 500. The term "polymer," as used herein, is meant to be inclusive of homopolymers and copolymers. Generally, base polymer (A) is not branched, and more typically, (A) is not a graft copolymer (i.e., base polymer (A) is generally a linear polymer or copolymer). The base polymer (A) may have any suitable modulus, e.g., at least or above 1, 2, 5, 10, 20, or 50 MPa, or even a significantly higher modulus, such as 0.1, 0.5, 1, 2, or 2.5 GPa polymer.

The base polymer (A) contains a multiplicity of at least one type of functional group selected from amino (—NH$_2$ or —NHR), amido (—C(O)NH$_2$ or —C(O)NHR), thiol (—SH), carboxylic acid (—C(O)OH), carboxylic acid ester (—C(O)OR), and epoxy groups, wherein R represents an alkyl group, such as a methyl, ethyl, n-propyl, or isopropyl group. In some embodiments, the functional groups are pendant groups. In other embodiments, the functional groups are within the backbone of the polymer, or both as pendant groups and in the backbone. In particular embodiments, the base polymer contains at least amino groups and/or amido groups. In the case of amino or amido groups, the nitrogen atom in the group should be attached to at least one hydrogen atom (i.e., the amino or amido group is primary or secondary, and not tertiary). In some embodiments, at least one of the foregoing functional groups is attached to each monomeric unit of the base polymer (A), in which case 100% of the monomeric units are functionalized. In other embodiments, a portion of the monomeric units do not contain any of the foregoing functional groups, such as may be the case when (A) is a copolymer composed of functionalized units and non-functionalized units. For purposes of the invention, the base polymer (A) should contain the functional groups in at least 20%, 30%, 40%, 50%, 60%, 70%, 80%, or 90% of the monomeric units of (A).

Some examples of base polymers (A) containing amino groups include poly(vinylamine), poly(N-methylvinylamine), poly(vinylamine)-co-poly(vinyl alcohol), poly(-aminostyrene), polyethyleneimine, amino-functionalized polyethylene, and amino-functionalized poly(dimethylsiloxane). Some examples of base polymers containing amido groups include polyacrylamide and the polyamides, such as nylon (6), nylon(6,6), the polyphthalamides, and polymers of amino acids. Some examples of base polymers containing carboxylic acids or esters thereof include polyacrylic acid, poly(methacrylic acid), poly(methyl acrylate), poly(methyl methacrylate), polyvinylacetate, poly(vinylbenzoic acid), polyvinylbenzoate, and poly(4-hydroxystyrene-co-methyl methacrylate). Some examples of base polymers containing thiol groups include polycarbophil-cysteine conjugates, chitosan-thioglycolic acid conjugates, thiol-functionalized ethylene glycol, and thiol-functionalized poly(dimethylsiloxane). Some examples of base polymers containing epoxy groups include block copolymers with poly(glycidyl methacrylate), poly(glycidyl acrylate), or various poly(vinyl epoxy)s as one block.

In some embodiments, the base polymer (A) is a linear polysaccharide. In one embodiment, the polysaccharide is a homopolysaccharide by having all of the monosaccharide units as the same type (e.g., all glucose units). In another embodiment, the polysaccharide is a heteropolysaccharide by having different types of monosaccharide units. The polysaccharide may be constructed of, for example, solely glucose units (i.e., a glucan polysaccharide). The glucan polysaccharide can be an α-glucan or β-glucan polysaccharide. A particular class of α-glucan polysaccharide considered herein is dextran. Some particular classes of β-glucan polysaccharides considered herein include cellulose, hemicellulose, cellodextrin, chrysolaminarin, lentinan, and zymosan. The polysaccharide contains one or more of any of the functional groups described above, e.g., an amino-functionalized, amido-functionalized, carboxy-functionalized, carboxy ester-functionalized, or thiol-functionalized polysaccharide. If the polysaccharide does not contain such functional groups in its natural state, the polysaccharide may be modified to include such functional groups by means well known in the art. In particular embodiments, the polysaccharide is functionalized with a multiplicity of amino and/or amido groups. In some embodiments, at least a portion of the glucose units can be derivatized, such as found in chitin (i.e., a polymer of N-acetylglucosamine) or chitosan (a polymer of predominantly glucosamine). Other derivatized glycans include the glycosaminoglycans, such as chondroitin sulfate, dermatan sulfate, heparin, heparan sulfate, hyaluronic acid, and keratan sulfate.

In other embodiments, the base polymer (A) is a vinyl-addition type of polymer, which, as well known, is derived from the polymerization of one or more vinylic monomers. For purposes of the invention, the vinyl-addition polymer should be functionalized with a multiplicity of any of the above-described functional groups. In some embodiments, the functional groups are incorporated by inclusion of functionalized monomer units (e.g., acrylamide) in the synthesis of the vinyl-addition polymer. In some embodiments, the vinyl-addition polymer includes a polyolefin (e.g., polyethylene or polypropylene, or copolymer thereof). Some examples of vinyl-addition polymers include homopolymers and copolymers of, for example, polyethylene, polypropylene, ethylene propylene rubber, a chlorinated polyolefin (e.g., polyvinylchloride, or PVC), a polydiene, such as polybutadiene (e.g., poly-1,3-butadiene or poly-1,2-butadiene), polyisoprene, dicyclopentadiene, ethylidene norbornene, vinyl norbornene, or a homogeneous or heterogeneous composite thereof, or a copolymer thereof (e.g., EPDM rubber, i.e., ethylene propylene diene monomer). In the case of polyethylene, the polyethylene can be any of the types of polyethylene known in the art, e.g., low density polyethylene (LDPE), linear low density polyethylene (LLDPE), very low density polyethylene (VLDPE), high density polyethylene (HDPE), medium density polyethylene (MDPE), high molecular weight polyethylene (HMWPE), and ultra high molecular weight polyethylene (UHMWPE). In the case of polypropylene, the polypropylene can also be any of the types of polypropylenes known in the art, e.g., isotactic, atactic, and syndiotactic polypropylene. The vinyl-addition polymer may also include polymerized segments or monomeric units of other vinylic monomers, such as styrene, acrylic acid, methacrylic acid, acrylonitrile, and halogenated polyolefins (e.g., fluorinated, chlorinated, or brominated polyolefins) as found, for example, in polystyrene, polyacrylic acid, polymethacrylic acid, polyacrylonitrile, polyvinylfluoride, polyvinylidene fluoride, polytetrafluoroethylene, and block, alternating, or random copolymers thereof.

The variable [B] in Formula (1) represents a multiplicity (represented by brackets, i.e., [ ]) of hydroxylated benzene rings covalently linked to the base polymer (A). Each hydroxylated benzene ring in each group B contains at least two hydroxy (OH) groups. Thus, the hydroxylated benzene rings may be, for example, dihydroxylated, trihydroxylated, tetrahydroxylated, or fully hydroxylated. In the B groups, at least two of the hydroxy groups on the hydroxylated benzene rings are free hydroxyl (OH) groups; thus, the B group is generally not bound to the base polymer (A) via an OH group. In the event the B group is bound to the base polymer (A) via an OH group (i.e., in the reaction; as an —O— linker after the reaction), the B groups should contain at least two free (unbound) OH groups. The B groups are typically bound to the base polymer (A) via a linker connecting a carbon atom of the benzene ring of the B group to the base polymer (A). In some embodiments, the B groups are attached to the base polymer (A) via the functional groups on the base polymer. In other embodiments, the B groups are attached to the base polymer (A) not via the functional groups. In yet other embodiments, a portion of the B groups is attached to the base polymer (A) via the functional groups and a portion of the B groups is attached to the base polymer (A) not via the functional groups. In order to maximize the availability of the OH groups, at least one or two of the OH groups on a benzene ring are located in a meta or para position of the benzene ring relative to the point of attachment of the benzene ring to the base polymer. In some embodiments, one of the OH groups on a benzene ring is located in a para position. In further embodiments, one of the OH groups on a benzene ring is located in a para position, and at least one of the OH groups is located in one or both meta positions. In some embodiments, OH groups are not permitted to occupy one or both of the ortho positions on the benzene ring, or OH groups are permitted to occupy one or both of the ortho positions provided that at least one or two other OH groups are present that occupy one or more meta or para positions. In some embodiments, the OH groups are located on adjacent carbon atoms on the benzene ring, in which case the B group can be referred to as a catechol group.

The B groups can be conveniently described by the following generic structure:

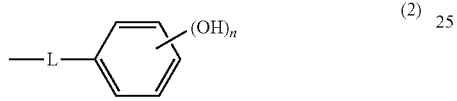
(2)

wherein, in Formula (2) above, n is 2, 3, 4, or 5, and L is a linker or a direct bond to the base polymer (A). In the case of L being a linker, the linker may be a single-atom or multi-atom linker. In some embodiments, the linker is or includes a —(CH$_2$)$_n$— moiety, where n is an integer of, for example, 1-12. The linker L may or may not include one or more heteroatoms (e.g., one or more oxygen, nitrogen, or sulfur atoms).

Some examples of hydroxylated benzene (B) groups include the following:

(2-1)

(2-2)

(2-3)

(2-4)

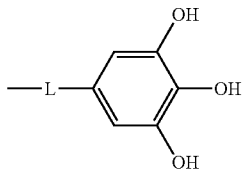
(2-5)

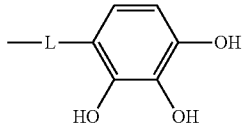
(2-6)

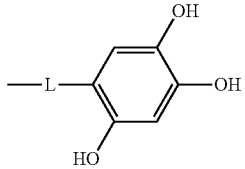
(2-7)

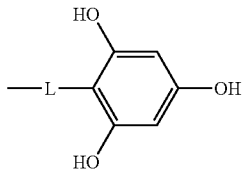
(2-8)

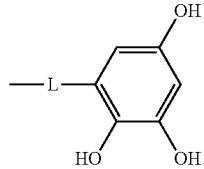
(2-9)

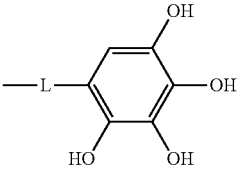
(2-10)

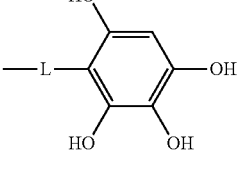
(2-11)

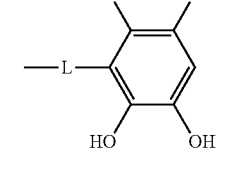
(2-12)

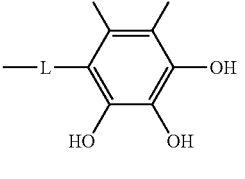
(2-13)

The variable w (in the expression [B]$_w$) in Formula (1) represents a grafting density of the B groups (also herein referred to as a "B group density," or in the case of B being a catechol, a "catechol density"). Generally, the grafting density is used to quantify the multiplicity (i.e., number) of B groups in the polymer. The grafting density (w) herein refers to the relative (percentage-wise) number of monomeric units in the base polymer ($A_x$) that are occupied by B groups relative to the total number of monomeric units (i.e., x) in the base polymer ($A_x$). For purposes of the invention, the variable w is typically an integer up to or less than 50%. In different embodiments, the variable w is precisely or about 1, 2, 5, 10, 15, 20, 25, 30, 35, 40, 45, or 50%, or a value within a range bounded by any two of the foregoing values (e.g., a range of 1-50%, 1-40%, 1-30%, 5-50%, 5-40%, or 5-30%).

The variable [C] in Formula (1) represents a multiplicity (represented by brackets, i.e., [ ]) of functional groups (C), as described above, on the base polymer A. As discussed above, a portion of the functional groups (C) are crosslinked with each other via a multiplicity of crosslinking groups (component iii). The remaining portions of functional groups that are not crosslinked with each other may be in free (unbound) form and/or bound to the multiplicity of hydroxylated benzene groups [B]. The crosslinking groups can be any groups known in the art that can crosslink between any of the functional groups described above. The crosslinking groups are typically difunctional (i.e., they link between only two functional groups), but they may be trifunctional or tetrafunctional in some cases. The crosslinking group generally contains at least or more than two, three, four, five, or six linking atoms between two functional groups. In some embodiments, the crosslinking groups, as found in the crosslinked polymer, include at least one, two, three, four, or more —$CH_2$— groups, and may or may not also include one or more —O— or —NH— linking groups between —$CH_2$— groups. The crosslinking groups may or may not also include cyclic groups, such as phenyl groups. In some embodiments, the crosslinking groups, as found in the crosslinked polymer, are alkylene linkers of the formula —$(CH_2)_n$— wherein n is at least 1, 2, 3, 4, or 5 and up to 10, 20, 30, 40, 50, 100, 200, 300, 400, or 500, or n may be within a range therein, such as, for example, 1-500, 1-300, 1-200, 1-100, 1-50, 1-20, or 1-10, or more particularly, n may be an integer of, for example, 1, 2, 3, 4, 5, 6, 7, 8, 9, 10, 11, or 12 (or within a range of such values), with each end of the alkylene linker bound to a functional group on the base polymer. Any of the foregoing crosslinking groups may or may not also include one or more heteroatoms, as mentioned above. In some embodiments, the crosslinking groups are oligomeric or polymeric, such as by including a polyethyleneoxide (PEO) segment. Generally, the crosslinking group is bound by covalent bonds to the functional groups on the base polymer, with removal of a hydrogen atom on the functional groups that are bound to the crosslinking group. For example, if two amino (—$NH_2$) functional groups are present on the base polymer, they may be crosslinked with a crosslinking group Y as a —NH—Y—NH— moiety.

The above-described crosslinked polymer composition can be produced by any suitable means. For example, a base polymer ($A_x$) can first be reacted with hydroxylated benzene rings containing a group reactive with functional groups residing on the base polymer. In the case of the base polymer containing amino or amido functional groups, a hydroxylated benzaldehyde can be reacted with the base polymer in order for the aldehyde groups to react with the amino or amido groups to form imine linkages, wherein the imine linkages may be reduced (e.g., with $NaBH_4$) to form amino linkages. Alternatively, dihydroxybenzoic acid (or ester derivative thereof) may be reacted with the foregoing base polymer to form amide linkages with the base polymer. In the case of the base polymer containing carboxylic acid or ester functional groups, a hydroxylated aniline (e.g., 4-aminocatechol) or hydroxylated benzylamine (e.g., 3,4-dihydroxybenzylamine) may be reacted with the base polymer in order for the amino groups to react with the carboxylic acid or ester functional groups to form amide linkages. In the case of the base polymer containing thiol functional groups, a hydroxylated benzene containing an iodoacetamide group may be reacted with the base polymer to form thioether linkages with the base polymer. A hydroxylated benzene molecule containing an iodoacetamide group can be prepared by standard chemistry techniques, e.g., an aminocatechol can be reacted with 2-iodoacetic acid to form a hydroxylated iodoacetanilide.

The base polymer derivatized with the hydroxylated benzene rings can then, in a second step, be crosslinked by reacting at least a portion of the remaining functional groups on the base polymer with difunctionalized, trifunctionalized, or tetrafunctionalized crosslinking molecules (e.g., telechelic oligomers or polymers) that contain two, three, or four groups, respectively, that are reactive with functional groups residing on the base polymer. The crosslinking molecules crosslink with reactive groups on the base polymer. The crosslinking molecules may crosslink within a base polymer strand and/or between base polymer strands. In the case of the base polymer containing amino, amido, or thiol functional groups, the reactive crosslinking molecules may be, for example, dihaloalkylene, trihaloalkylene, or tetrahaloalkylene molecules, or dialdehyde, trialdehyde, or tetraaldehyde molecules, or dicarboxylate, tricarboxylate, or tetracarboxylate, or di-epoxy, tri-epoxy, or tetra-epoxy molecules, e.g., X—$(CH_2)_n$—X, wherein X represents a chloro, bromo, or iodo atom, or an aldehyde group, or carboxylate group, or an epoxy group, and n is within a range of, for example, 1-500, 1-300, 1-200, 1-100, 1-50, 1-20, or 1-10. In some embodiments, n is 1, 2, 3, 4, 5, 6, 7, 8, 9, 10, 11, or 12, or a value within a range bounded by any two of the foregoing values). In the case of the base polymer containing carboxylic acid or ester groups, the reactive linking molecules may be, for example, diaminoalkylene, triaminoalkylene, or tetraminoalkylene molecules (e.g., Z—$(CH_2)_n$—Z, a diaminoalkylene molecule, wherein Z represents an amino group). In some embodiments, the crosslinking molecules are oligomeric or polymeric, such as by including a polyethyleneoxide (PEO) segment, which may be further functionalized, with, for example, two, three, or four aldehyde, amino, amido, carboxylic acid, carboxylic acid ester, or epoxy groups.

Generally, the hydroxylated benzene molecules are reacted with the base polymer ($A_x$) so that up to or less than 50% of monomeric units in the base polymer ($A_x$) are occupied with hydroxylated benzene molecules relative to the total number of monomeric units (i.e., x) in the base polymer ($A_x$). In different embodiments, the hydroxylated benzene molecules may be included in the reaction in an amount of precisely or about 1, 2, 5, 10, 15, 20, 25, 30, 35, 40, 45, or 50%, or a value within a range bounded by any two of the foregoing values (e.g., a range of 1-50%, 1-40%, 1-30%, 5-50%, 5-40%, or 5-30%).

Generally, the crosslinking groups are included in an amount of at least or above 1%, 2%, or 5%, but no more than or less than 6%, 8%, 10%, 20%, 30%, 40%, 45%, or 50% of the total functional groups (e.g., amino or amido groups) present in the base polymer. Alternatively, the crosslinking groups are included in an amount of, for example, 1, 2, 3, 4, 5, 6, 7, 8, 9, 10, 12, 15, 18, or 20 wt % by weight of the crosslinked polymer, or in an amount within a range bounded by any two of the foregoing values (e.g., 1-10 wt % or 1-8 wt % or 1-6 wt %).

In another aspect, the invention is directed to a lithium-ion battery containing the above-described crosslinked polymer composition in the anode (negative electrode on discharge) of the battery. The lithium-ion battery generally contains the components typically found in a lithium-ion battery, including positive (cathodic on discharge) and negative (anodic on discharge) electrodes, current collecting plates, and a battery shell, such as described in, for example, U.S. Pat. Nos. 8,496,855, 8,252,438, 7,205,073, and 7,425,388, the contents of which are incorporated herein by reference in their entirety. The construction and assembly of lithium-ion batteries are well known in the art.

The negative (anode) electrode includes any of the carbon-containing and/or silicon-containing anode materials known in the art dispersed within the above-described crosslinked polymer composition. The carbon-containing composition is typically one in which lithium ions can intercalate or embed, such as graphite (e.g., natural or artificial graphite), petroleum coke, carbon fiber (e.g., mesocarbon fibers), carbon (e.g., mesocarbon) microbeads, fullerenes (e.g., carbon nanotubes, i.e., CNTs), and graphene. In particular embodiments, the anode includes a silicon-containing composition dispersed within the above-described crosslinked polymer composition. The silicon-containing composition, which may be used in the absence or presence of a carbon-containing composition in the anode, can be any of the silicon-containing compositions known in the art for use in lithium-ion batteries. Lithium-ion batteries containing a silicon-containing anode may alternatively be referred to as lithium-silicon batteries. The silicon-containing composition may be, for example, in the form of a silicon-carbon (e.g., silicon-graphite, silicon-carbon black, silicon-CNT, or silicon-graphene) composite, silicon microparticles, or silicon nanoparticles, including silicon nanowires. The negative electrode composition is often further admixed with an adhesive (e.g., PVDF, PTFE, and co-polymers thereof) in order to gain the proper viscosity and density for molding as electrodes.

The positive (cathode) electrode is generally a lithium-containing material, such as, for example, lithium foil, a lithium metal oxide, or lithium-intercalated material, wherein the metal is typically a transition metal, such as Co, Fe, Ni, or Mn, or combination thereof. Some examples of cathode materials include $LiCoO_2$, $LiMn_2O_4$, $LiNiCoO_2$, $LiNiCoAlO_2$, $LiMnO_2$, and $LiFePO_4$, as well as spinel lithium manganese oxide compositions according to the formula $Li_xMn_{2-y-z}Ni_yM_zO_{4-n}X_n$, (e.g., $0.025 \le x \le 1.1$, $0.3 \le y \le 0.5$, $0 \le z \le 1.5$, $0 \le n \le 1$, wherein M is a main group or transition metal, and X is a halide atom, such as F, Cl, Br, or I) in which a portion of the manganese is substituted with another metal. To improve conductivity at the positive electrode, a conductive carbon material (e.g., carbon black, carbon fiber, graphite, carbon nanotubes, buckminsterfullerenes, or carbon foam) is often admixed with the positive electrode material. The positive electrode composition is also typically admixed with a binder or adhesive (e.g., PVdF, PTFE, and co-polymers thereof) in order to be properly molded as an electrode. As also known in the art, the positive and negative electrodes are typically affixed onto current collecting substrates, such as Cu or Al foil.

The lithium-ion battery may also include a solid porous membrane positioned between the negative and positive electrodes. The solid porous membrane can be composed of, for example, a plastic or polymeric material (e.g., polyethylene, polypropylene, or copolymer thereof) or an inorganic material, such as a transition metal oxide (e.g., titania, zirconia, yttria, hafnia, or niobia) or main group metal oxide, such as silicon oxide, which can be in the form of glass fiber.

As well known in the art, the lithium-ion battery typically also includes a lithium-containing electrolyte. The lithium-containing electrolyte typically includes at least one lithium electrolyte salt dissolved in a polar aprotic solvent (which may be composed of one or more polar aprotic solvents). The polar aprotic solvent can be, for example, ionic (e.g., an ionic liquid) or non-ionic. The one or more polar aprotic solvents are preferably non-reactive with the components of the lithium-ion battery, including the anode and the cathode, and furthermore, do not have a deleterious effect on the performance characteristics of the battery. The polar aprotic solvent, if present, can be any such solvent known to be useful in a lithium-ion battery. The polar aprotic solvent typically has a melting point of up to or less than 100, 90, 80, 70, 60, or 50° C., and more typically, below room temperature, i.e., below about 25° C., and more typically, up to or less than 20, 15, 10, 5, or 0° C. The non-ionic solvent can be, for example, a carbonate, sulfone, siloxane, silane, ether, ester, nitrile, sulfoxide, or amide solvent, or a mixture thereof.

Some examples of carbonate solvents suitable for use in an electrolyte include propylene carbonate (PC), ethylene carbonate (EC), butylene carbonate (BC), chloroethylene carbonate, fluorocarbonate solvents (e.g., fluoroethylene carbonate and trifluoromethyl propylene carbonate), as well as the dialkylcarbonate solvents, such as dimethyl carbonate (DMC), diethyl carbonate (DEC), dipropyl carbonate (DPC), ethyl methyl carbonate (EMC), methyl propyl carbonate (MPC), fluoroethylene carbonate (FEC), and ethyl propyl carbonate (EPC).

Some examples of sulfone solvents suitable for use in an electrolyte include methyl sulfone, ethyl methyl sulfone, methyl phenyl sulfone, methyl isopropyl sulfone (MiPS), propyl sulfone, butyl sulfone, tetramethylene sulfone (sulfolane), phenyl vinyl sulfone, allyl methyl sulfone, methyl vinyl sulfone, divinyl sulfone (vinyl sulfone), diphenyl sulfone (phenyl sulfone), dibenzyl sulfone (benzyl sulfone), vinylene sulfone, butadiene sulfone, 4-methoxyphenyl methyl sulfone, 4-chlorophenyl methyl sulfone, 2-chlorophenyl methyl sulfone, 3,4-dichlorophenyl methyl sulfone, 4-(methylsulfonyl)toluene, 2-(methylsulfonyl)ethanol, 4-bromophenyl methyl sulfone, 2-bromophenyl methyl sulfone, 4-fluorophenyl methyl sulfone, 2-fluorophenyl methyl sulfone, 4-aminophenyl methyl sulfone, a sultone (e.g., 1,3-propanesultone), and sulfone solvents containing ether groups (e.g., 2-methoxyethyl(methyl)sulfone and 2-methoxyethoxyethyl(ethyl)sulfone).

The polar aprotic solvent can be silicon-containing, e.g., a siloxane or silane. Some examples of siloxane solvents include hexamethyldisiloxane (HMDS), 1,3-divinyltetramethyldisiloxane, the polysiloxanes, and polysiloxane-polyoxyalkylene derivatives. Some examples of silane solvents include methoxytrimethylsilane, ethoxytrimethylsilane, dimethoxydimethylsilane, methyltrimethoxysilane, and 2-(ethoxy)ethoxytrimethylsilane.

Other types of polar aprotic solvents include ether, ester, nitrile, sulfoxide, and amide solvents. Some examples of ether solvents include diethyl ether, 1,2-dimethoxyethane, 1,2-diethoxyethane, 1,3-dioxolane, tetrahydrofuran, 2-methyltetrahydrofuran, tetrahydropyran, diglyme, triglyme, 1,3-dioxolane, and the fluorinated ethers (e.g., mono-, di-, tri-, tetra-, penta-, hexa- and per-fluoro derivatives of any of the foregoing ethers). Some examples of ester solvents include 1,4-butyrolactone, ethylacetate, methylpropionate, ethylpropionate, propylpropionate, methylbutyrate, ethylbutyrate, the formates (e.g., methyl formate, ethyl formate, or propyl formate), and the fluorinated esters (e.g., mono-, di-, tri-, tetra-, penta-, hexa- and per-fluoro derivatives of any of the foregoing esters). Some examples of nitrile solvents include acetonitrile, propionitrile, and butyronitrile. Some examples of sulfoxide solvents include dimethyl sulfoxide, ethyl methyl sulfoxide, diethyl sulfoxide, methyl propyl sulfoxide, and ethyl propyl sulfoxide. Some examples of amide solvents include formamide, N,N-dimethylformamide, N,N-diethylformamide, acetamide, dimethylacetamide, diethylacetamide, gamma-butyrolactam, and N-methylpyrrolidone. The polar aprotic solvent may also be, for example, an organochloride (e.g., methylene chloride, chloroform, 1,1-trichloroethane), ketone (e.g., acetone, 2-butanone), organoether (e.g., diethyl ether, tetrahydrofuran, and dioxane), hexamethylphosphoramide (HMPA), N-methylpyrrolidinone (NMP), 1,3-dimethyl-3,4,5,6-tetrahydro-2(1H)-pyrimidinone (DMPU), and propylene glycol monomethyl ether acetate (PGMEA).

In some embodiments, the polar aprotic solvent is partially or completely replaced with one or more ionic liquid compounds. The ionic liquid can be denoted by the formula $Y^+X^-$, wherein $Y^+$ is a cationic component of the ionic liquid and $X^-$ is an anionic component of the ionic liquid. The formula $(Y^+)(X^-)$ is meant to encompass a cationic component ($Y^+$) having any valency of positive charge, and an anionic component ($X^-$) having any valency of negative charge, provided that the charge contributions from the cationic portion and anionic portion are counterbalanced in order for charge neutrality to be preserved in the ionic liquid molecule. More specifically, the formula $(Y^+)(X^-)$ is meant to encompass the more generic formula $(Y^{+a})_y(X^{-b})_x$, wherein the variables a and b are, independently, non-zero integers, and the subscript variables x and y are, independently, non-zero integers, such that a·y=b·x (wherein the period placed between variables indicates multiplication of the variables).

The ionic liquid compound is typically a liquid at room temperature (e.g., 15, 18, 20, 22, 25, or 30° C.) or lower. However, in some embodiments, the ionic liquid may become a liquid at a higher temperature than 30° C. if it is used at an elevated temperature that melts the ionic liquid. Thus, in some embodiments, the ionic liquid may have a melting point of up to or less than 100, 90, 80, 70, 60, 50, 40, or 30° C. In other embodiments, the ionic liquid is a liquid at or below 10, 5, 0, −10, −20, −30, or −40° C.

In various embodiments, the cationic portion ($Y^+$) of the ionic liquid $Y^+X^-$ is selected from imidazolium, pyridinium, pyrazinium, pyrrolidinium, piperidinium, piperazinium, morpholinium, pyrrolium, pyrazolium, pyrimidinium, triazolium, oxazolium, thiazolium, and triazinium rings, as well as quaternary ammonium, phosphonium, sulfonium, and cyclic and acyclic guanidinium rings. The counteranion ($X^-$) of the ionic liquid can be any of the counteranions well known in the art. In some embodiments, the counteranion is inorganic by not including any C—C, C—H, or C—F bonds, such as a halide (e.g., $F^-$, $Cl^-$, $Br^-$, or $I^-$), $PCl_6^-$, $PF_6^-$, perchlorate, chlorate, chlorite, cyanate, isocyanate, thiocyanate, isothiocyanate, perbromate, bromate, bromite, periodate, iodate, dicyanamide (i.e., $N(CN)_2^-$), tricyanamide (i.e., $N(CN)_3^-$), nitrate, nitrite, carbonate, bicarbonate, sulfate, sulfite, hydrogensulfate, hydrogensulfite, phosphate, hydrogenphosphate ($HPO_4^{2-}$), and dihydrogenphosphate ($H_2PO_4^-$). In other embodiments, the counteranion is carbon-containing (i.e., organic) by containing at least one C—C, C—H, or C—F bond, such as the carboxylates (e.g., formate, acetate, propionate, butyrate, valerate, lactate, pyruvate, oxalate, malonate, glutarate, adipate, decanoate, salicylate, ibuprofenate, and the like), the sulfonates (e.g., $CH_3SO_3^-$, $CH_3CH_2SO_3^-$, $CH_3(CH_2)_2SO_3^-$, benzenesulfonate, toluenesulfonate, dodecylbenzenesulfonate, docusate, and the like), the alkoxides (e.g., methoxide, ethoxide, isopropoxide, phenoxide, and glycolate), the amides (e.g., dimethylamide and diisopropylamide), diketonates (e.g., acetylacetonate), the organoborates (e.g., $BR_1R_2R_3R_4^-$, wherein $R_1$, $R_2$, $R_3$, $R_4$ are typically hydrocarbon groups containing 1 to 6 carbon atoms), the fluorosulfonates (e.g., $CF_3SO_3^-$, $CF_3CF_2SO_3^-$, $CF_3(CF_2)_2SO_3^-$, $CHF_2CF_2SO_3^-$, and the like), the fluoroalkoxides (e.g., $CF_3O^-$, $CF_3CH_2O^-$, $CF_3CF_2O^-$, and pentafluorophenolate), the fluorocarboxylates (e.g., trifluoroacetate and pentafluoropropionate), and the fluorosulfonylimides (e.g., $(CF_3SO_2)_2N^-$).

In some embodiments, any one or more classes or specific types of polar aprotic solvents and/or ionic liquids are excluded from the electrolyte. In other embodiments, a combination of two or more polar aprotic solvents and/or ionic liquids are included in the electrolyte.

The lithium-containing species (generally, a lithium salt) can be any of the lithium-containing species known in the art for use in lithium-ion batteries. Any of the counteranions $X^-$, described above, can be included as a counteranion in the lithium salt. In one embodiment, the lithium-containing species is non-carbon-containing (i.e., inorganic). For example, the lithium-containing species can be a lithium ion salt of such counteranions as the halides (e.g., $F^-$, $Cl^-$, $Br^-$, or $I^-$), hexachlorophosphate ($PCl_6^-$), hexafluorophosphate ($PF_6^-$), perchlorate, chlorate, chlorite, perbromate, bromate, bromite, periodate, iodate, aluminum fluorides (e.g., $AlF_4^-$), aluminum chlorides (e.g., $Al_2Cl_7^-$ and $AlCl_4^-$), aluminum bromides (e.g., $AlBr_4^-$), nitrate, nitrite, sulfate, sulfite, phosphate, phosphite, arsenate, hexafluoroarsenate ($AsF_6^-$), antimonate, hexafluoroantimonate ($SbF_6^-$), selenate, tellurate, tungstate, molybdate, chromate, silicate, the borates (e.g., borate, diborate, triborate, tetraborate), tetrafluoroborate, anionic borane clusters (e.g., $B_{10}H_{10}^{2-}$ and $B_{12}H_{12}^{2-}$), perrhenate, permanganate, ruthenate, perruthenate, and the polyoxometallates.

In another embodiment, the lithium-containing species is carbon-containing (i.e., organic). The organic counteranion may, in one embodiment, lack fluorine atoms. For example, the lithium-containing species can be a lithium ion salt of such counteranions as carbonate, the carboxylates (e.g., formate, acetate, propionate, butyrate, valerate, lactate, pyruvate, oxalate, malonate, glutarate, adipate, decanoate, and the like), the sulfonates (e.g., $CH_3SO_3^-$, $CH_3CH_2SO_3^-$, $CH_3(CH_2)_2SO_3^-$, benzenesulfonate, toluenesulfonate, dodecylbenzenesulfonate, and the like), the alkoxides (e.g., methoxide, ethoxide, isopropoxide, and phenoxide), the amides (e.g., dimethylamide and diisopropylamide), diketonates (e.g., acetylacetonate), the organoborates (e.g., $BR_1R_2R_3R_4^-$, wherein $R_1$, $R_2$, $R_3$, $R_4$ are typically hydrocarbon groups containing 1 to 6 carbon atoms), anionic carborane clusters, the alkylsulfates (e.g., diethylsulfate), alkylphosphates (e.g., ethylphosphate or diethylphosphate), dicyanamide (i.e., $N(CN)_2^-$), and the phosphinates (e.g., bis-(2,4,4-trimethylpentyl)phosphinate). The organic counteranion may, in another embodiment, include fluorine atoms. For example, the lithium-containing species can be a lithium ion salt of such counteranions as the fluorosulfonates (e.g., $CF_3SO_3^-$, $CF_3CF_2SO_3^-$, $CF_3(CF_2)_2SO_3^-$, $CHF_2CF_2SO_3^-$, and the like), the fluoroalkoxides (e.g., $CF_3O^-$, $CF_3CH_2O^-$, $CF_3CF_2O^-$, and pentafluorophenolate), the fluorocarboxylates (e.g., trifluoroacetate and pentafluoropropionate), and the fluorosulfonylimides (e.g., $(CF_3SO_2)_2N^-$).

In some embodiments, any one or more classes or specific types of the above-described lithium-containing species are excluded from the electrolyte. In other embodiments, a combination of two or more lithium salts are included in the electrolyte. Other cationic species, such as sodium ions or an ammonium species, may or may not also be included.

The lithium-containing species is incorporated in the electrolyte medium in an amount that imparts a suitable concentration of lithium ions and suitable level of conductivity to the electrolyte medium. The conductivity of the electrolyte medium can be, for example, at least 0.01 mS/cm (0.001 S/m) at an operating temperature of interest, and particularly at a temperature within 20-60° C. In different embodiments, the lithium-containing species is present in the electrolyte in a concentration of precisely, about, at least, above, up to, or less than, for example, 0.1, 0.5, 1.0, 1.2, 1.5, 1.8, 2, 2.5, or 3 M, where "M" indicates a molarity concentration.

In yet another aspect, the invention is directed to a method of operating a lithium-ion battery, described above, that contains the above-described crosslinked polymer composition, as described above, in an anode of the battery. The operation of lithium-ion batteries is well known in the art. The lithium-ion battery described herein can advantageously exhibit an initial delithiation capacity of at least or above, for example, 500, 550, 600, 650, 700, or 750 mAh/g, or an initial delithiation capacity within a range bounded by any two of the foregoing values. The lithium-ion battery described herein can alternatively or in addition exhibit a $100^{th}$ (i.e., at the $100^{th}$ cycle) delithiation capacity of at least or above, for example, 200, 250, 300, 350, 400, 450, 500, 550, or 600 mAh/g, or a $100^{th}$ delithiation capacity within a range bounded by any two of the foregoing values. In some embodiments, the lithium-ion battery maintains any of the foregoing delithiation capacities for 150, 200, 250, 300, 350, 400, 450, 500, 600, 700, 800, 900, or 1000 cycles. The lithium-ion battery described herein can alternatively or in addition exhibit an initial coulombic efficiency of at least or above, for example, 60%, 65%, 70%, 75%, 80%, 85%, 90%, or 95%, or an initial coulombic efficiency within a range bounded by any two of the foregoing values. The lithium-ion battery described herein can alternatively or in addition exhibit a $20^{th}$ (i.e., at the $20^{th}$ cycle) coulombic efficiency of at least or above, for example, 98.0%, 98.5%, 99.0%, or 99.5%. In some embodiments, the lithium-ion battery maintains any of the foregoing coulombic efficiencies for 30, 40, 50, 60, 70, 80, 90, or 100 cycles.

Examples have been set forth below for the purpose of illustration and to describe certain specific embodiments of the invention. However, the scope of this invention is not to be in any way limited by the examples set forth herein.

EXAMPLES

Synthesis of a Catechol-Functionalized Chitosan (CS-CG)

The synthetic methodology used is in accordance with the following general scheme:

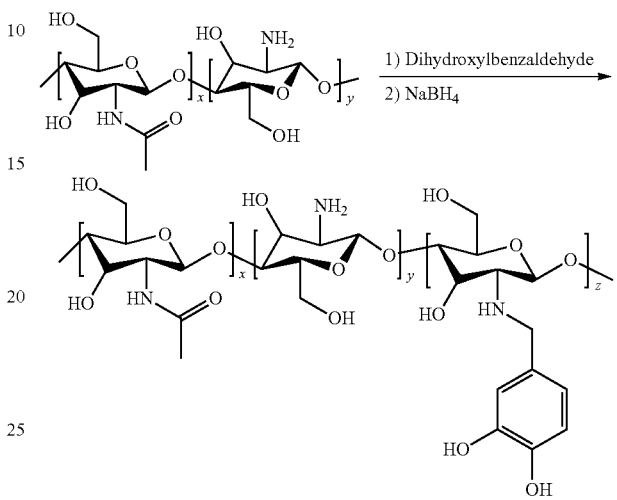

Instead of using an amide coupling reaction that requires multi-step reaction/purification and difficulty in achieving a high degree of substitution, an aldehyde terminated catechol, i.e., dihydroxybenzaldehyde, was utilized to couple with the primary amine groups on chitosan (CS) via a Schiff reaction followed by reduction of imine bond as shown above. In the following description, CS=chitosan and CG=catechol groups. A typical synthesis of CS-CG10% (i.e., with CG density of 10%) was performed as follows. 2 g of chitosan was dissolved in 40 mL of 1 wt % acetic acid solution and stirred overnight. After addition of 3,4-dihydroxybenzaldehyde (DHB) solution (i.e., 0.9 g/6.0 mmol of DHB in 20 mL water and 10 mL methanol), the mixture was stirred for one hour. With the solution immersed in the ice bath, $NaBH_4$ solution was added dropwise to the solution until a pH of 8 was reached and when the white polymer precipitated out. The precipitate was triply washed with deionized (DI) water. Further purification was performed by dialysis as follows: 0.5N HCl solution for five hours and then in 0.5 wt % acetic acid solution for two hours.

The composition was confirmed by $^1H$ NMR and IR spectroscopy. In the Fourier-Transform Infra-Red (FT-IR) spectrum of CS and catechol functional chitosan (CS-CG), the appearance of absorption bands at 787 $cm^{-1}$ and 1347 $cm^{-1}$ correspond to aromatic bending and phenyl O—H bending, which indicates successful grafting of catechol groups on the CS. The $^1H$ NMR spectrum of CS-CG confirmed aromatic protons corresponding to the catechol moieties, and the grafting ratio of catechol group on the chitosan is calculated to be 10% from the comparative peak integration of the aromatic protons and the methine next to the amine groups Crosslinking of CS-CG10% with Glutaraldehyde (GA) to Produce CS-CG10%-GA The synthetic methodology used is in accordance with the following general scheme:

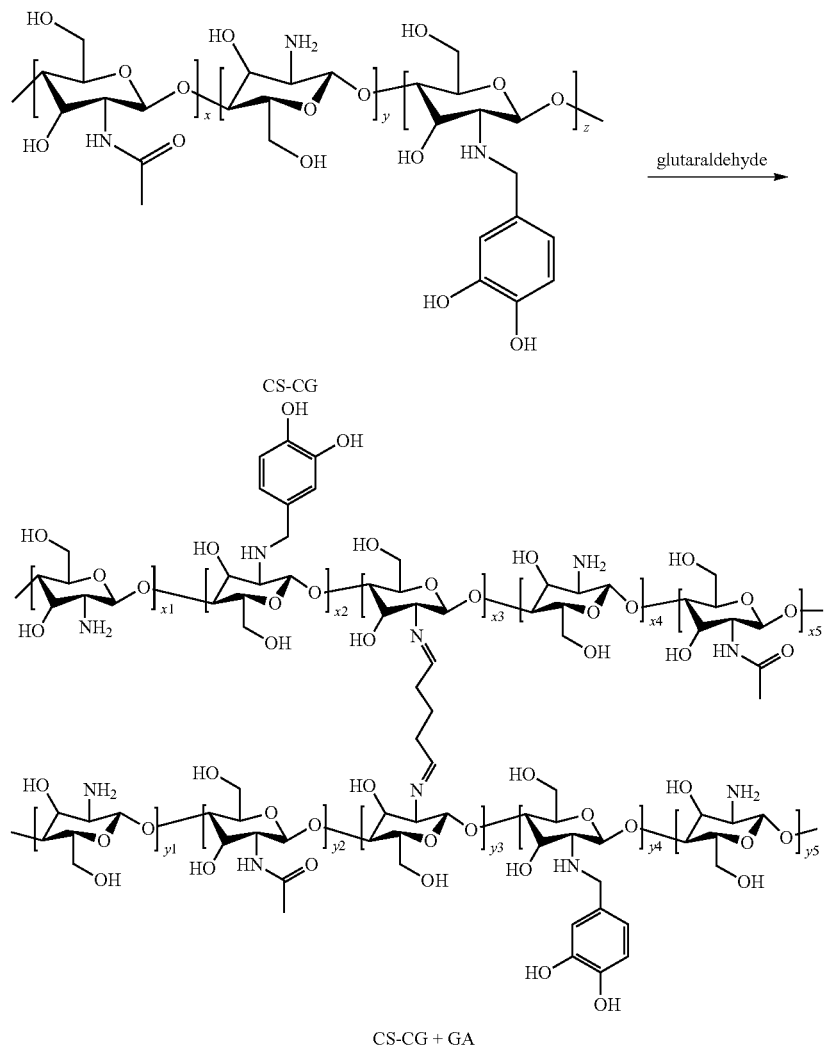

In a typical crosslinking reaction, glutaraldehyde with two aldehyde groups is reacted with the free amine groups on the catechol-functionalized chitosan via a Schiff reaction to form imine bonds. The reaction was stirred for two hours at room temperature to result in a partial reaction. Further vacuum drying at 80° C. further facilitated the reaction and afforded a crosslinked polymer network. The IR spectrum of the obtained polymer network shows the peak at 1660 cm$^{-1}$ in the FT-IR spectrum of CS-CG+GA, and this confirms the formation of imine bonds.

Preparation of Electrodes and Assembly of Coin Cells

All coin cells (stainless steel CR-2032) were prepared and assembled in an argon-filled glovebox. Specific amounts of GA (1%, 3%, 6%, 10% or 20% wt %, relative to the weight of CS-CG) were added to the aqueous solution of CS-CG, followed by two hours of stirring at room temperature. After addition of silicon nanoparticles (SiNPs) (60 wt %, <100 nm), carbon black (20 wt %) to the above polymer binder solution (20 wt %), the composite was homogenized for two hours. The slurry was coated on a copper foil by using a doctor blade (4 mil), and the coated electrode was placed in a vacuum oven for 18 hours at 65° C. before it was transferred into the glovebox for coin cell assembly. The coin cells consisted of polypropylene (Celgard 2400) as separator, 1.2 M lithium hexafluorophosphate (LiPF$_6$) in ethylene carbonate (EC), ethyl methyl carbonate (EMC) (EC:EMC=3:7 by weight) with 10 wt % of fluoroethylene carbonate (FEC) as electrolyte, and lithium metal as a counter electrode. Galvanostatic cycling between 10 mV and 1.9 V was conducted using a Series 4000 MACCOR™ batteries cycler. All cells were kept in a temperature controlled chamber at 25° C. during cycling. The dQ/dV profile (CV) between 10 mV and 1V vs. Li/Li$^+$ was executed on a VSP300 potentiostat with a constant voltage rate (10 mV/s) at room temperature. All of the specific capacities reported in this study were calibrated per gram of active materials (SiNPs). The C rate was also determined based on the theoretical capacity upon a full lithiation of active materials (SiNPs).

Formation of a 3-D polymer network was proved useful in improving the mechanical robustness of the polymer binder materials, and in-situ crosslinking with the active materials was found to be especially advantageous on the finalized binder performance. Glutaraldehyde (GA) was herein demonstrated as an efficient crosslinker for CS via the Schiff mechanism. Significant viscosity rise after the reaction between GA and CS-CG is attributed to the crosslinking reaction, and the peak at 1660 cm$^{-1}$ in the FT-IR spectrum of CS-CG+GA confirmed the formation of an imine bond. These results demonstrate that GA is an efficient crosslinker for CS-CG in forming a functional polymer network. In aqueous solution, GA (6 wt % to that of CS-CG) was added to the catechol functionalized chitosan (CS-CG10%) to form a pre-crosslinked polymer solution (CS-CG10%+GA6%) which was then mixed with silicon nanoparticles (SiNPs, active materials) and carbon black (CB, conductive agent). The SiNPs based composite film was dried at 80° C. under vacuum to remove solvent and facilitate the in-situ crosslinking reaction.

FIG. 1A is a scanning electron microscope (SEM) image of the SiNP based composite electrode with CS-CG10%+6% GA as the binder; FIG. 1B is a zoom-in area for energy-dispersive X-ray spectroscopy (EDX) mapping; and FIGS. 1C, 1D, and 1E show the EDX mapping of silicon, carbon, and oxygen, respectively, in the specified area. As shown by the SEM image in FIG. 1A, the pristine composite film exhibits porous architectures (porosity was calculated to be 73.1±1.0%). Energy-dispersive X-ray spectroscopy (EDX) mapping of carbon, oxygen and especially silicon confirms the homogeneous distribution of active materials in the composite anode film. The resulting homogenous dispersion is achieved by the suitable solution viscosity and the presence of controlled substitution of adhesion groups that prevents aggregation of active components during electrode fabrication process.

Cycling Performance of Si Anode with CS-CG+GA Network Binder

The adhesion capability of the polymer binders was initially tailored according to the galvanostatic test of Si-based anode. As illustrated in the specific capacity and coulombic efficiency vs. cycle number graphs shown in FIGS. 2A and 2B, respectively, PVDF is not an efficient binder for the Si-based electrode due to its weak adhesion capability, although the cycling performance of the Si-PVDF electrode can be improved by heat treatment. The electrode with CS showed significantly improved electrochemical performance (in terms of initial de-lithiation capacity, initial coulombic efficiency and cycling performance) compared with that of PVDF, which is most probably due to its promoted adhesion with the SiNPs (34.3±1.6 nF for CS vs. 10.0±3.3 nF for PVDF). The presence of a large number of polar groups (free amine and hydroxyl groups) in the CS may form strong hydrogen bonding with the hydroxylated Si surface, while the PVDF can only utilize the Van der Waals forces with the active materials. CS with different grafting densities of catechol groups was synthesized and confirmed by $^1$HNMR spectroscopy. The CS-CG10% composition exhibited higher initial de-lithiation capacity and better cycling performance (1890±17 mAh/g at 100th cycle) than those of CS (1734±12 mAh/g at 100th cycle) due to the addition of wetness-resistant adhesion groups. As illustrated in FIG. 3A, the adhesion capability with SiNPs enhances significantly when the grafting density of catechol groups increased from 10% to 25%. However, the SiNPs-based anode with the binder of CS-CG25% revealed more rapid capacity fade, which dropped below 1,000 mAh/g after 10 charging-discharging cycles. Moreover, the prepared composite slurry with further increased grafting density of catechol groups, i.e., CS-CG56% as the binder, could not even form a qualified coating on copper foil.

Figure 2A:
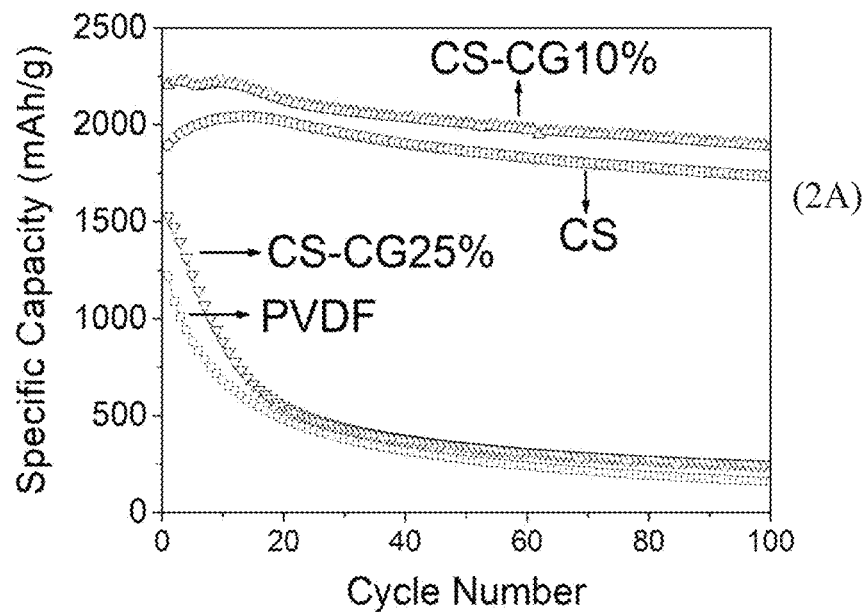
FIGS. 2A-2B.
Figure 2B:
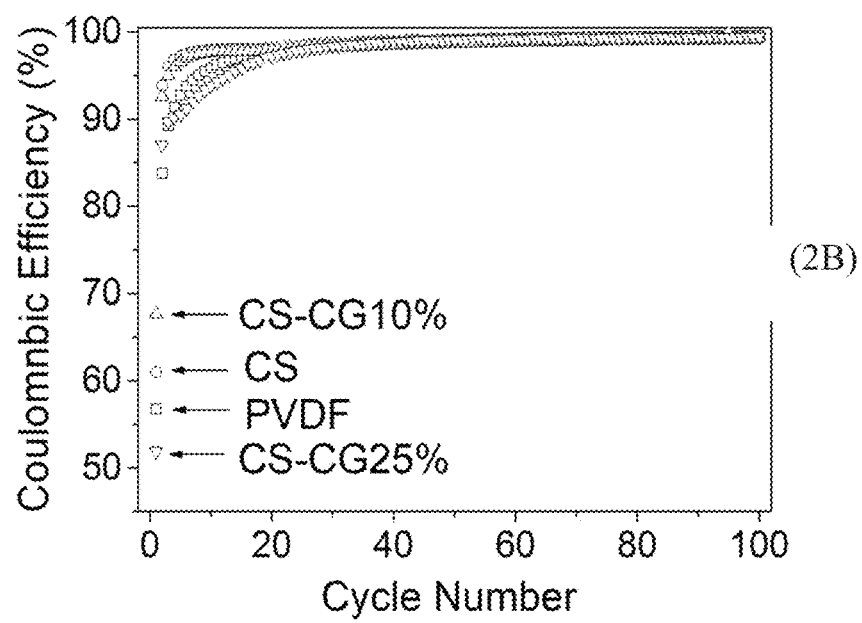
Figure 3A:
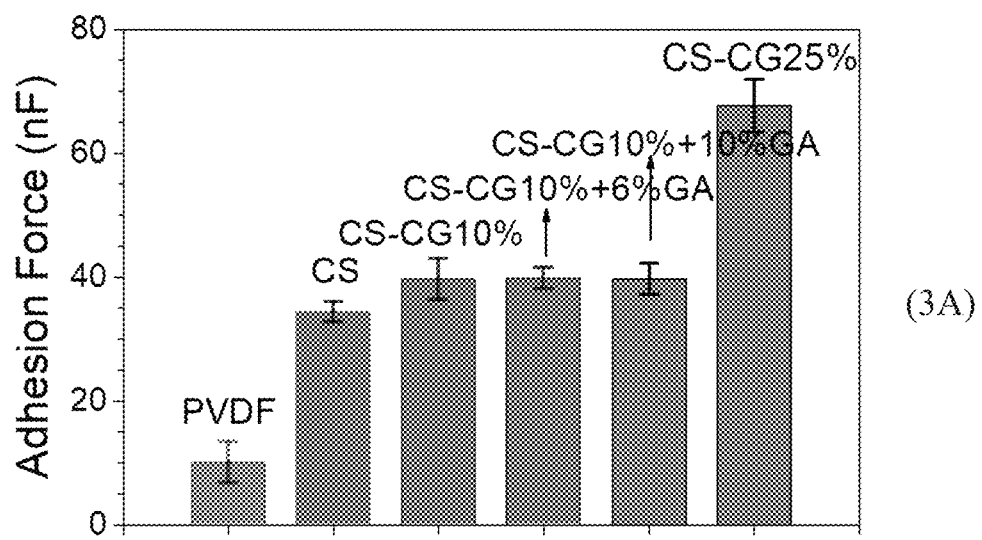
FIGS. 3A-3B.
Figure 3B:
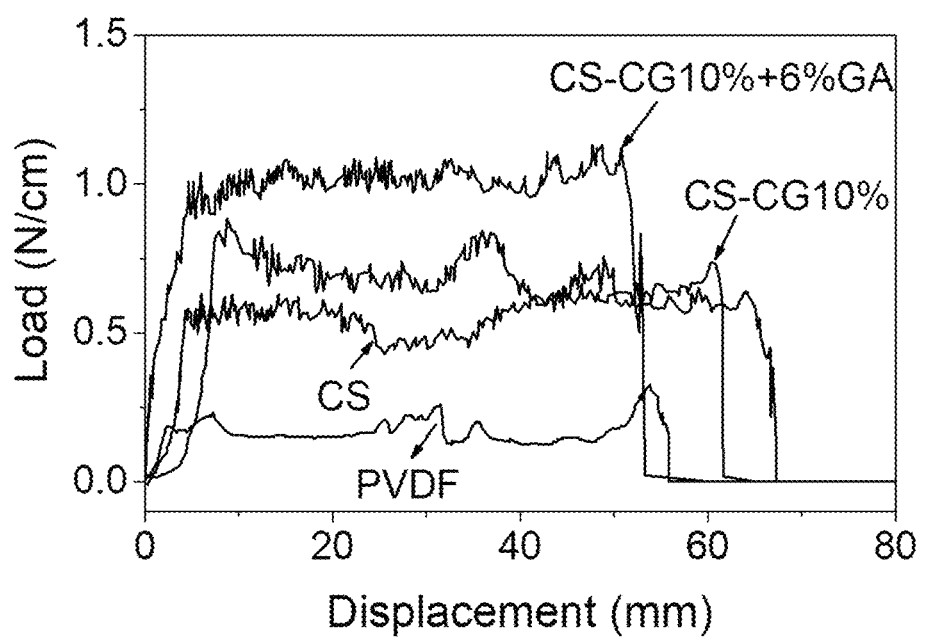

The significantly improved cycling performance of Si-based electrodes with binders from PVDF to CS and then to CS-CG10% (see initial coulombic efficiencies and capacity retention in FIGS. 2A and 2B) can be attributed to their enhanced adhesion capability with SiNPs (see FIG. 3A). In addition, the polymer binders with polar groups tend to form a composite coating possessing higher adhesion strength with copper foil (see FIG. 3B), which also ensures the electrical pathway to the current collector. However, simply enhancing the adhesion strength will not improve the cycling performance indefinitely, and other parameters become increasingly important. Despite the expected higher adhesion of CS-CG25% over CS-CG10% with SiNPs (FIG. 3A), the comparative peel test of SiNPs-based anodes exhibited a much lower peel force of an anode coating with CS-CG25% on the current collector, which indicates a higher chance of delamination during the cycling process. The lower solution viscosity and higher rigidity of CS with higher degree of catechol substitution may also affect the mechanical robustness of the composite coatings and the adhesion strength with the current collector.

Figure 4:
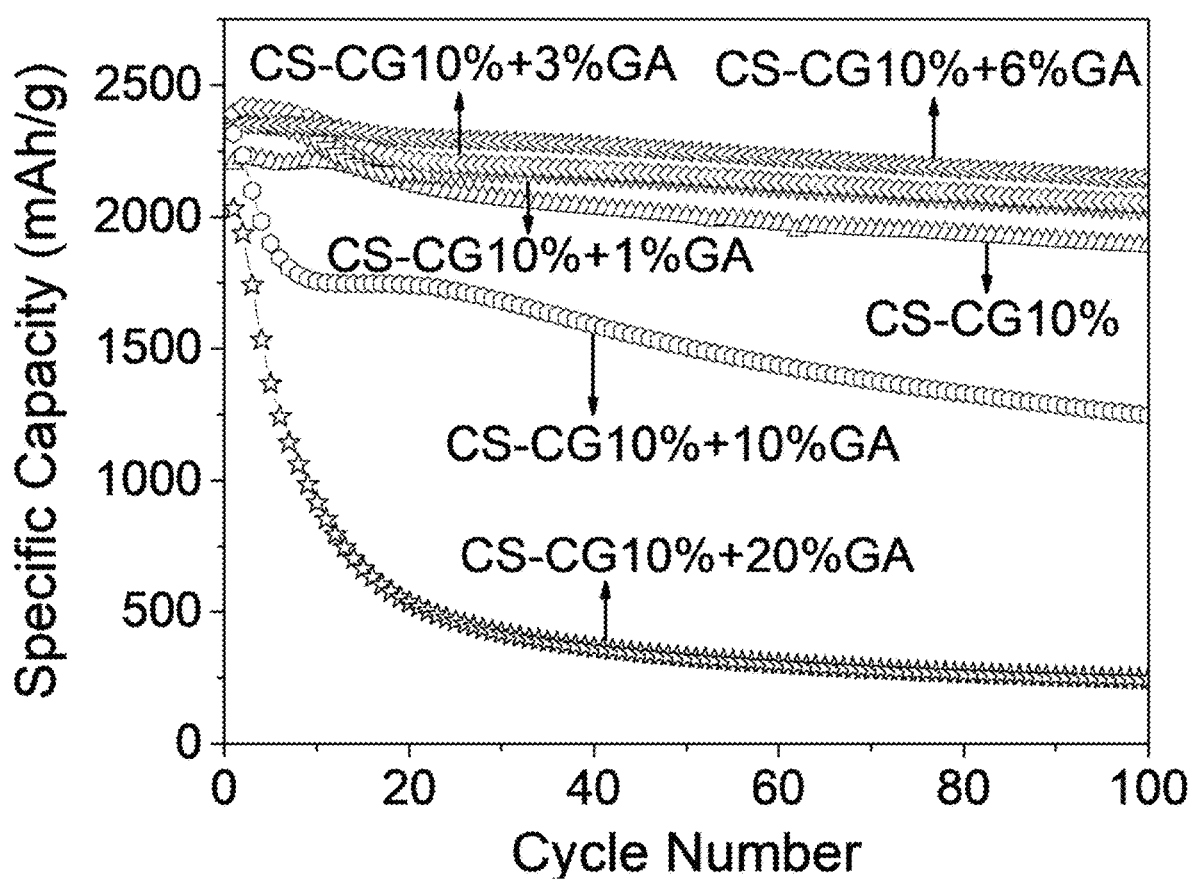
FIG. 4. Graph showing cycling performance of SiNPs-based electrodes with the following anode polymer binders having different crosslinking densities: CS-CG10%, CS-CG10%+1% GA, CS-CG10%+3% GA, CSCG10%+6% GA, CS-CG10%+10% GA, CS-CG10%+20% GA.

FIG. 4 is a graph showing cycling performance of SiNPs-based electrodes with the following anode polymer binders having different crosslinking densities: CS-CG10%, CS-CG10%+1% GA, CS-CG10%+3% GA, CSCG10%+6% GA, CS-CG10%+10% GA, CS-CG10%+20% GA. With CS-CG10% as the functional polymer binder, the crosslinking density of the functional polymer network is further tuned by varying the feed ratio of glutaraldehyde (GA) to CS-CG10% composition. With 1 wt % GA, the SiNPs-based electrode exhibited improved cycling performance (2030±7.9 vs. 1890±9.3 mAh/g at 100th cycle) due to the formation of a 3-D network. Slightly improved capacity retention was observed when increasing the crosslinking density of the functional polymer network (addition of GA: from 1 wt % to 3 wt % and to 6 wt %). The SiNPs-based anode with CS-CG10%+GA6% as binder exhibited the highest initial de-lithiation capacity (2345±19 mAh/g) and an improved cycling performance, with 91.5% capacity retention after 100 cycles. However, when further increasing the crosslinking density, the SiNPs based anode with CS-CG10%+GA10% only had a specific capacity of 1246 mAh/g after 100 cycles, although its initial specific capacity is not significantly lower than that of CS-CG10%+GA6% (2317±21 vs. 2345±19 mAh/g). The electrode with CS-CG10%+GA20% as binder showed even worse electrochemical performance in both initial specific capacity and cycling stability.

Lithium polyacrylate (LiPAA) is considered to be one of the state-of-the-art non-conductive (electrically) polymer binders for the Si anode, and the high molecular weight LiPAA has been employed as a control binder for SiNPs-based anodes due to its strong interaction with SiNPs and capability to provide additional lithium source (H. Wu et al., *Nature Communications*, 4, p. 1943, 2013). The SiNPs-based anode with LiPAA exhibited better cycling performance (1884±11 mA/g at 100th cycle) than that of CS (1734±12 mAh/g at 100th cycle) and comparable with that of CS-CG10% (1890±17 mAh/g at 100th cycle). The functional polymer network (CS-CG10%+GA6%) fabricated by rational design in this study demonstrates better binder performance than LiPAA.

Figure 5A:
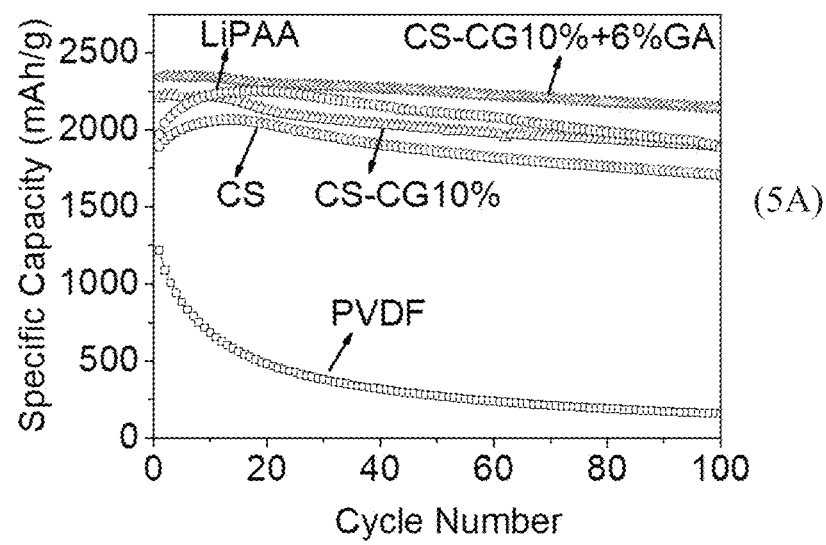
FIGS. 5A-5D.
Figure 5B:
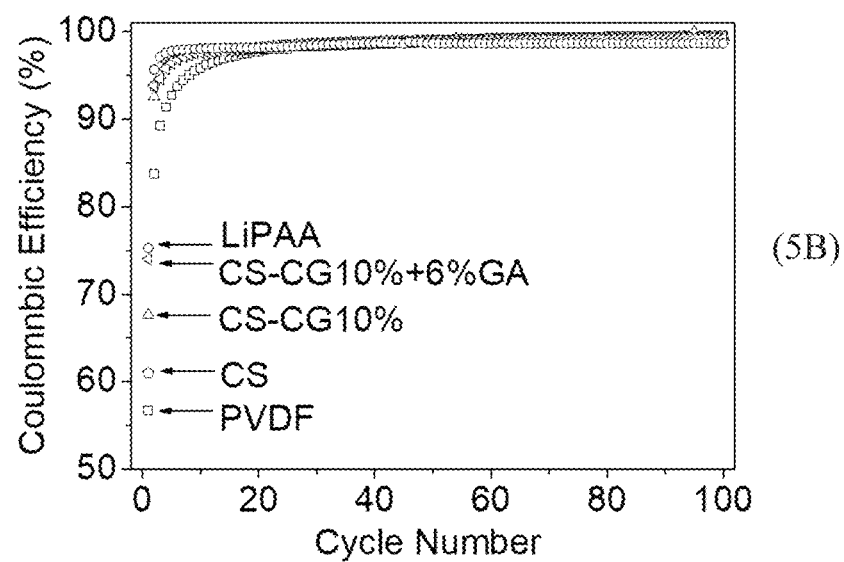
Figure 5C:
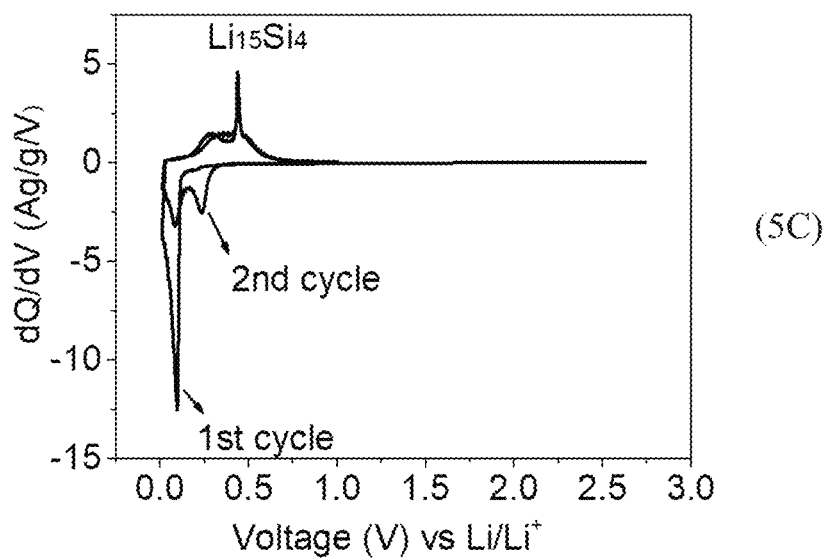
Figure 5D:
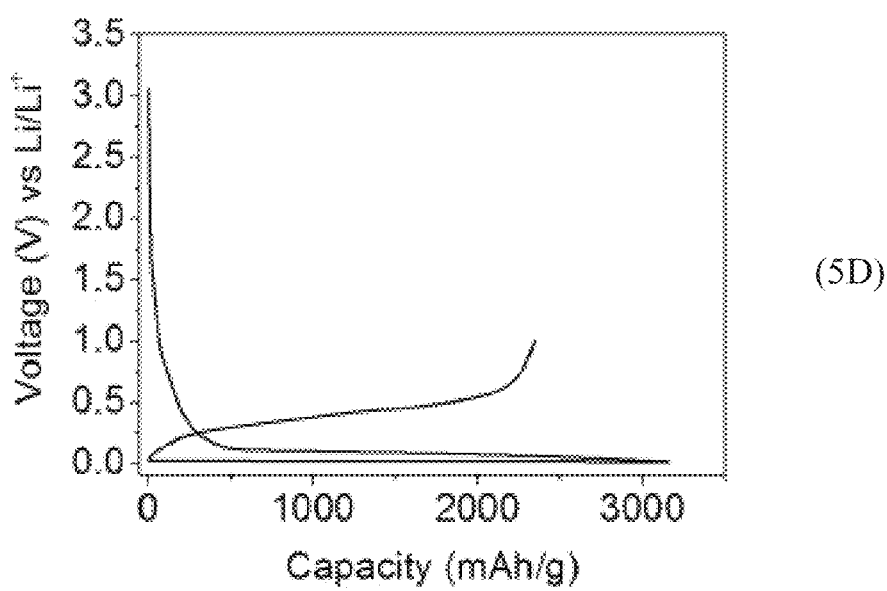

FIG. 5A is a graph showing cycling performance and FIG. 5B is a graph showing coulombic efficiency. Each graph is for SiNPs-based electrodes with different anode polymer binders as follows: PVDF, CS, LiPAA, CS-CG10% and CS-CG10%+GA6%. The SiNPs-based anode with LiPAA exhibited better cycling performance (1884±11 mA/g at 100th cycle) than that of CS (1734±12 mAh/g at 100th cycle) and comparable with that of CS-CG10% (1890±17 mAh/g at 100th cycle). The functional polymer network (CS-CG10%+GA6%) fabricated by rational design in this study demonstrates better binder performance than LiPAA. FIG. 5C is a graph showing a dQ/dV profile and FIG. 5D is a graph showing the first voltage vs. capacity curve. Each graph is for SiNPs-based electrodes with CS-CG10%+GA6% as the binder. As particularly illustrated in the dQ/dV profile of the SiNPs-based electrode with CS-CG10%+GA6% as binder in FIG. 5C, the sharp cathodic peak lying close to 0.01 V at the first cycle corresponds to the lithiation of crystalline SiNPs. The two anodic peaks (0.34 V and 0.44 V) at the following delithiation scan transfer the $Li_xSi$ to amorphous Si, and the following cathodic peaks (0.24 V and 0.09 V) are typical lithiation of amorphous Si. The first voltage vs. capacity profile shows the slightly lower initial lithiation capacity of Si (3159 mAh/g) compared with the theoretical capacity (3759 mAh/g for $Li_{15}Si_4$) is probably due to the incomplete lithiation of crystalline Si and the presence of native $SiO_2$.

The improved cycling performance of silicon electrode with crosslinked functional polymer binders (of CS-CG10% to +GA1%, +GA3% and +GA6%) can be explained by the improved mechanical robustness of composite electrode and stability of the conductive network (polymer network with attached carbon black) around the SiNPs. As illustrated in FIG. 3A (see CS-CG10% and CS-CG10%+GA6%), no significant difference was observed on the adhesion forces with SiNPs upon the addition of cross-linker. Increased adhesion force observed by peel test demonstrated a mechanically robust composite coating that is important in retaining electron transport during cycling process.

FIGS. 6A-6D are SEM images of SiNPs-based electrodes with polymer binder (A) PDVF, (B) CS, (C) CS-CG10%+GA6%, and (D) CS-CG10%+GA20% before (top panes) and after (bottom panes) 100 lithiation/delithiation cycles. After 100 lithiation-delithiation cycles, significant cracks were observed for the SiNPs-based anode with PDVF as the binder due to its poor capability to hold the composite materials, whereas the electrode with CS as binder exhibited a slightly lower number of cracks after the cycling process. A less smooth surface was observed for the pristine composite anode with CS-CG10%+GA6% as a binder, which is probably due to the formation of 3-D network and higher porosity in the obtained electrode coating. However, after 100 lithiation-delithiation cycles, no significant crack increase was observed on the SiNPs-based anode with CS-CG10%+GA6%. The comparative SEM results show that the SiNPs-based anode with mechanically robust binder formed by crosslinking can maintain the integrity of the composite electrode after cycling, which is vital to retain the conductive network and minimize the de-activation of the active materials during the cycling process. These results emphasize the role of both enhanced adhesion capability and mechanical robustness of the polymer binders in the ultimate cycling performance of Si anodes.

Figures 6A, 6B, 6C, 6D:
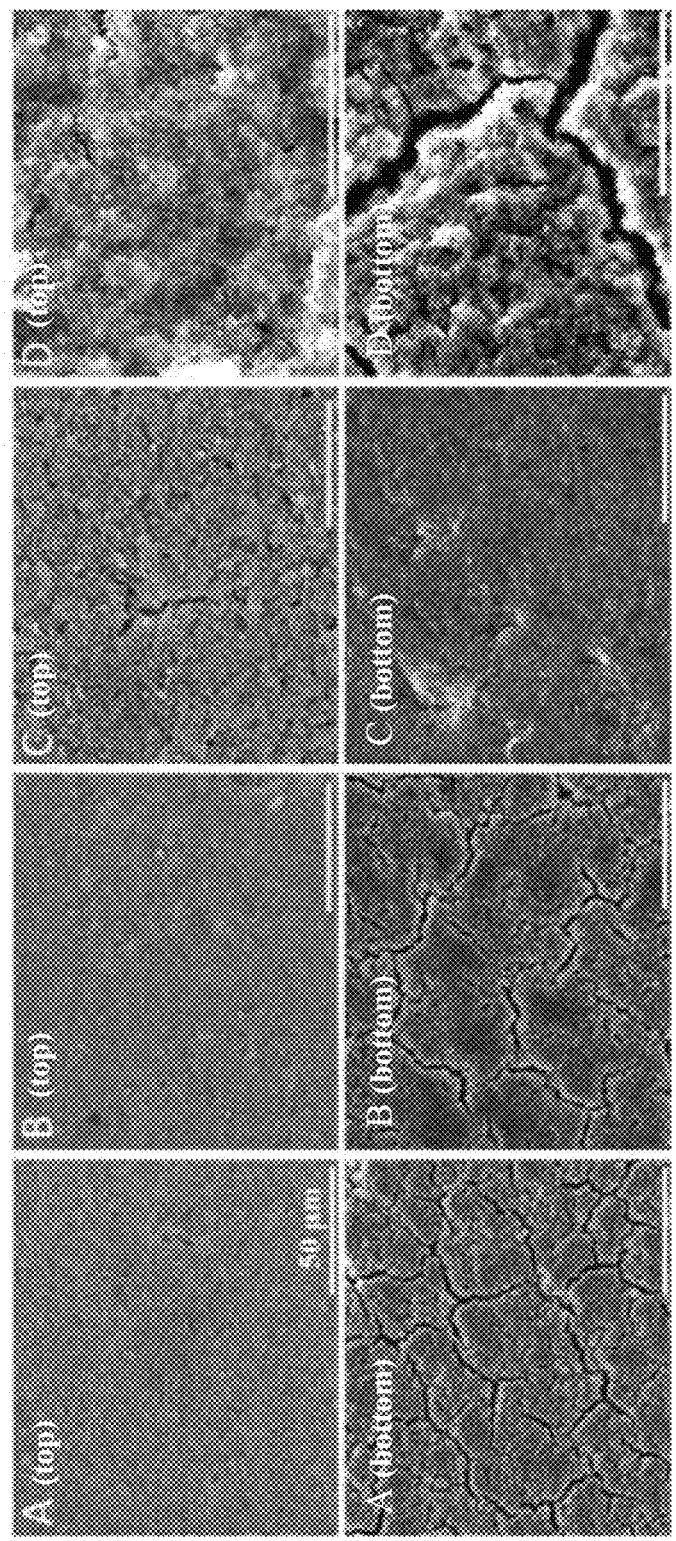
FIGS. 6A-6D. SEM images of SiNPs-based electrodes with polymer binder (A) PDVF, (B) CS, (C) CS-CG10%+GA6%, and (D) CS-CG10%+GA20% before (top panes) and after (bottom panes) 100 lithiation/delithiation cycles.

The balance between stress relaxation and network stiffness appear to be responsible for the unique relationship between crosslinking density of functional polymer network and cycling performance of the resulting Si electrodes. Upon further increasing the crosslinking density from 6% to 10% and 20% (FIG. 4), significantly higher network stiffness dominates the ultimate cycling performance. A peel test of the silicon anode with CS-CG10%+GA20% as a binder demonstrated very weak adhesion of the anode coating with the current collector, and a significant force drop (almost to 0) was frequently observed during the peeling process. SEM images of silicon anode with CS-CG10%+GA20% revealed slight cracks even before the galvanostatic test (FIG. 6D), and more significant cracks were observed after the lithiation/delithiation process (FIG. 6D, bottom). These results suggest that the brittle nature of the composite coating causes an adverse effect, which may be attributed to the high stiffness of highly the crosslinked polymer network. Although both adhesion capability and mechanical robustness are crucial to the electrochemical property of polymer binders, this experiment clearly indicates that the optimized cycling performance is obtained by balancing rheological properties of the composite slurry, mechanical property of the anode coating, and adhesion capability with both an active material and a current collector.

While there have been shown and described what are at present considered the preferred embodiments of the invention, those skilled in the art may make various changes and modifications which remain within the scope of the invention defined by the appended claims.

What is claimed is:

1. A crosslinked polymer composition comprising:
   (i) a base polymer containing a multiplicity of at least one type of functional group selected from amino, amido, thiol, carboxylic acid, carboxylic acid ester, and epoxy groups;
   (ii) a multiplicity of hydroxylated benzene rings covalently linked to the base polymer, wherein each hydroxylated benzene ring contains at least two hydroxy groups, and with at least two of the hydroxy groups on said hydroxylated benzene rings being free as OH groups; and
   (iii) a multiplicity of crosslinking groups that crosslink at least two of said functional groups in the base polymer.

2. The crosslinked polymer of claim 1, wherein the base polymer contains at least amino groups.

3. The crosslinked polymer of claim 2, wherein the base polymer is a polysaccharide.

4. The crosslinked polymer of claim 3, wherein said polysaccharide is chitosan.

5. The crosslinked polymer of claim 2, wherein at least a portion of said amino groups are crosslinked by said crosslinking groups.

6. The crosslinked polymer of claim 1, wherein said crosslinking groups contain at least one —$CH_2$— linkage, with each end of the cros slinking group bound to a functional group on the base polymer.

7. The crosslinked polymer of claim 1, wherein component (ii) is a multiplicity of catechol groups.

8. The crosslinked polymer of claim 1, wherein no more than 50% of the polymerized units in the base polymer are bound to component (ii).

9. The crosslinked polymer of claim 1, wherein component (iii) is present in an amount of no more than 20 wt % by weight of the crosslinked polymer.

10. The crosslinked polymer of claim 1, wherein the base polymer contains at least one type of functional group selected from the group consisting of amino, amido, and thiol groups, and wherein at least a portion of said functional groups is crosslinked by said cros slinking groups.

11. The crosslinked polymer of claim 1, wherein the base polymer contains functional groups selected from amino and amido groups, and wherein at least a portion of said functional groups is crosslinked by said crosslinking groups.

12. A lithium-ion battery comprising:
    (a) an anode comprising silicon nanoparticles embedded within a crosslinked polymer composition;
    (b) a cathode; and
    (c) a lithium-containing electrolyte in contact with said anode and cathode;
    wherein said crosslinked polymer composition comprises:
    (i) a base polymer containing a multiplicity of at least one type of functional group selected from amino, amido, thiol, carboxylic acid, carboxylic acid ester, and epoxy groups;
    (ii) a multiplicity of hydroxylated benzene rings covalently linked to the base polymer, wherein each hydroxylated benzene ring contains at least two hydroxy groups, and with at least two of the hydroxy groups on said hydroxylated benzene rings being free as OH groups; and
    (iii) a multiplicity of crosslinking groups that crosslink at least two of said functional groups in the base polymer.

13. The lithium-ion battery of claim 12, wherein said anode further comprises an electrically conducting carbon component embedded within the crosslinked polymer composition.

14. The lithium-ion battery of claim 13, wherein said electrically conducting carbon component comprises carbon black.

15. The lithium-ion battery of claim 12, wherein said cathode is selected from lithium metal and lithium-intercalated materials.

16. The lithium-ion battery of claim 12, wherein the base polymer contains at least amino groups.

17. The lithium-ion battery of claim 16, wherein the base polymer is a polysaccharide.

18. The lithium-ion battery of claim 17, wherein said polysaccharide is chitosan.

19. The lithium-ion battery of claim 16, wherein at least a portion of said amino groups are crosslinked by said crosslinking groups.

20. The lithium-ion battery of claim 12, wherein said cros slinking groups contain at least one —$CH_2$— linkage, with each end of the cros slinking group bound to a functional group on the base polymer.

21. The lithium-ion battery of claim 12, wherein component (ii) is a multiplicity of catechol groups.

22. The lithium-ion battery of claim 12, wherein no more than 50% of the polymerized units in the base polymer are bound to component (ii).

23. The lithium-ion battery of claim 12, wherein component (iii) is present in an amount of no more than 20 wt % by weight of the crosslinked polymer.

* * * * *